United States Patent
Eberwine et al.

(10) Patent No.: US 10,572,645 B2
(45) Date of Patent: Feb. 25, 2020

(54) SYSTEMS AND METHODS FOR A CREDENTIAL INCLUDING MULTIPLE ACCESS PRIVILEGES

(71) Applicant: Schlage Lock Company LLC, Carmel, IN (US)

(72) Inventors: Todd Eberwine, Golden, CO (US);
Donald L. Beene, Noblesville, IN (US);
Daniel R. Sharp, Golden, CO (US);
Michelle Vickrey, Whitestown, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

(21) Appl. No.: 15/832,206

(22) Filed: Dec. 5, 2017

(65) Prior Publication Data

US 2018/0225441 A1 Aug. 9, 2018

Related U.S. Application Data

(63) Continuation of application No. 14/728,508, filed on Jun. 2, 2015, now Pat. No. 9,870,460.

(Continued)

(51) Int. Cl.
*G06F 21/34* (2013.01)
*G07C 9/00* (2020.01)
*H04W 12/08* (2009.01)
*H04L 29/06* (2006.01)
*H04W 12/06* (2009.01)

(52) U.S. Cl.
CPC ............ *G06F 21/34* (2013.01); *G07C 9/00* (2013.01); *G07C 9/00007* (2013.01); *H04L 63/102* (2013.01); *H04W 12/0608* (2019.01); *H04W 12/08* (2013.01); *G06F 2221/2113* (2013.01); *H04L 63/083* (2013.01); *H04L 63/0853* (2013.01)

(58) Field of Classification Search
CPC .................. G06F 21/34; G06F 2221/2113
USPC .................. 235/380, 382, 382.5, 492
See application file for complete search history.

(56) References Cited

U.S. PATENT DOCUMENTS 8,730,004 B2 * 5/2014 Elfstrom ............... G06Q 10/02
340/5.6
9,142,069 B2 * 9/2015 Conlin ............... G07C 9/00111
(Continued)

FOREIGN PATENT DOCUMENTS

| CN | 101297282 A | 10/2008 |
|---|---|---|
| CN | 102063479 A | 5/2011 |
| WO | 2013155562 A1 | 10/2013 |

OTHER PUBLICATIONS

International Search Report; International Searching Authority; US Patent and Trademark Office; International PCT Application No. PCT/US2015/033820; dated Sep. 2, 2015; 2 pages.

(Continued)

*Primary Examiner* — Paultep Savusdiphol
(74) *Attorney, Agent, or Firm* — Taft Stettinius & Hollister LLP

(57) ABSTRACT

A credential for use in an access control system may include a first sector including first data of a first database type, and a second sector including second data of a second database type. The credential may further include a third sector including third data related to the second data. The first database type and the second database type may be different types.

20 Claims, 5 Drawing Sheets

Related U.S. Application Data

(60) Provisional application No. 62/006,723, filed on Jun. 2, 2014.

(56) References Cited

U.S. PATENT DOCUMENTS

| | | | | |
|---|---|---|---|---|
| 9,153,083 | B2* | 10/2015 | Radicella | G07C 9/00111 |
| 9,531,544 | B2* | 12/2016 | Parkinson | H04L 9/3247 |
| 2004/0153671 | A1* | 8/2004 | Schuyler | G07C 9/00 726/9 |
| 2004/0254882 | A1* | 12/2004 | Scheidt | G06F 21/31 705/50 |
| 2005/0204167 | A1* | 9/2005 | Conlin | G07C 9/00007 726/5 |
| 2005/0235148 | A1* | 10/2005 | Scheidt | G06F 21/31 713/168 |
| 2006/0054687 | A1* | 3/2006 | Betti | G06Q 20/26 235/380 |
| 2008/0041943 | A1* | 2/2008 | Radicella | G07C 9/00087 235/382 |
| 2008/0111659 | A1* | 5/2008 | Pesapane | G07C 9/00103 340/5.6 |
| 2008/0301464 | A1* | 12/2008 | Parkinson | H04L 9/3247 713/186 |
| 2010/0276487 | A1* | 11/2010 | Radicella | G07C 9/00087 235/382 |
| 2011/0115603 | A1* | 5/2011 | Conlin | G07C 9/00007 340/5.7 |
| 2011/0178930 | A1* | 7/2011 | Scheidt | G06F 21/31 705/50 |
| 2011/0187493 | A1* | 8/2011 | Elfstrom | G06Q 10/02 340/5.6 |
| 2012/0159579 | A1 | 6/2012 | Pineau et al. | |
| 2012/0240220 | A1 | 9/2012 | Smith | |
| 2014/0002236 | A1* | 1/2014 | Pineau | G06F 21/32 340/5.6 |
| 2014/0052630 | A1* | 2/2014 | Bona | G06K 19/06187 705/41 |
| 2014/0070003 | A1* | 3/2014 | Radicella | G07C 9/00111 235/382 |
| 2014/0203078 | A1* | 7/2014 | Radicella | G07C 9/00087 235/382 |
| 2015/0279132 | A1* | 10/2015 | Perotti | G07C 9/00309 340/5.52 |
| 2016/0019733 | A1* | 1/2016 | Robinton | H04W 4/04 340/5.61 |

OTHER PUBLICATIONS

Written Opinion of the International Searching Authority; International Searching Authority; US Patent and Trademark Office; International PCT Application No. PCT/US2015/033820; dated Sep. 2, 2015; 6 pages.

Extended European Search Report; European Patent Office; European Patent Application No. 15802379.6; dated Nov. 23, 2017; 7 pages.

Mexican Office Action; Mexican Patent Office; Mexican Patent Application No. MX/a/2016/016009; dated May 16, 2018; 4 pages.

European Examination Report; European Patent Office; European Patent Application No. 15802379.6; dated Nov. 6, 2018; 8 pages.

Chinese Search Report; Chinese Patent Office; Chinese Patent Application No. 201580040412.0; dated Jul. 12, 2019; 5 pages.

Chinese Office Action; Chinese Patent Office; Chinese Patent Application No. 201580040412.0; dated Jul. 23, 2019; 18 pages.

* cited by examiner

SYSTEMS AND METHODS FOR A CREDENTIAL INCLUDING MULTIPLE ACCESS PRIVILEGES

CROSS REFERENCE TO RELATED APPLICATIONS

The present application is a continuation of U.S. patent application Ser. No. 14/728,508 filed on Jun. 2, 2015 and issued as U.S. Pat. No. 9,836,593, which claims the benefit of U.S. Provisional Application No. 62/006,723 filed on Jun. 2, 2014, the contents of each application hereby incorporated by reference in their entirety.

BACKGROUND

The present application generally relates a credential for an access control system, and more specifically relates to a credential that includes multiple access privileges for access in access control systems including multiple access privilege databases. Access control systems generally restrict access to certain areas, thereby allowing certain persons access to the areas based on the credential. Some access control system credentials have certain limitations such as, for example, an access control system including multiple lock types, with each lock type having different privilege database types that may require a different type of credential for access authorization to each lock. Therefore, a need remains for further improvements in systems and methods for credentials in access control systems.

SUMMARY

One embodiment includes a unique system and method for a credential having multiple access privileges. This summary is not intended to identify key or essential features of the claimed subject matter, nor is it intended to limit the scope of the claimed subject matter. Further embodiments, forms, objects, features, advantages, aspects, and benefits shall become apparent from the following description and drawings.

BRIEF DESCRIPTION OF THE DRAWINGS

The description herein makes reference to the accompanying figures wherein like reference numerals refer to like parts throughout the several views, and wherein.

DESCRIPTION OF ILLUSTRATIVE EMBODIMENTS

Figure 1:
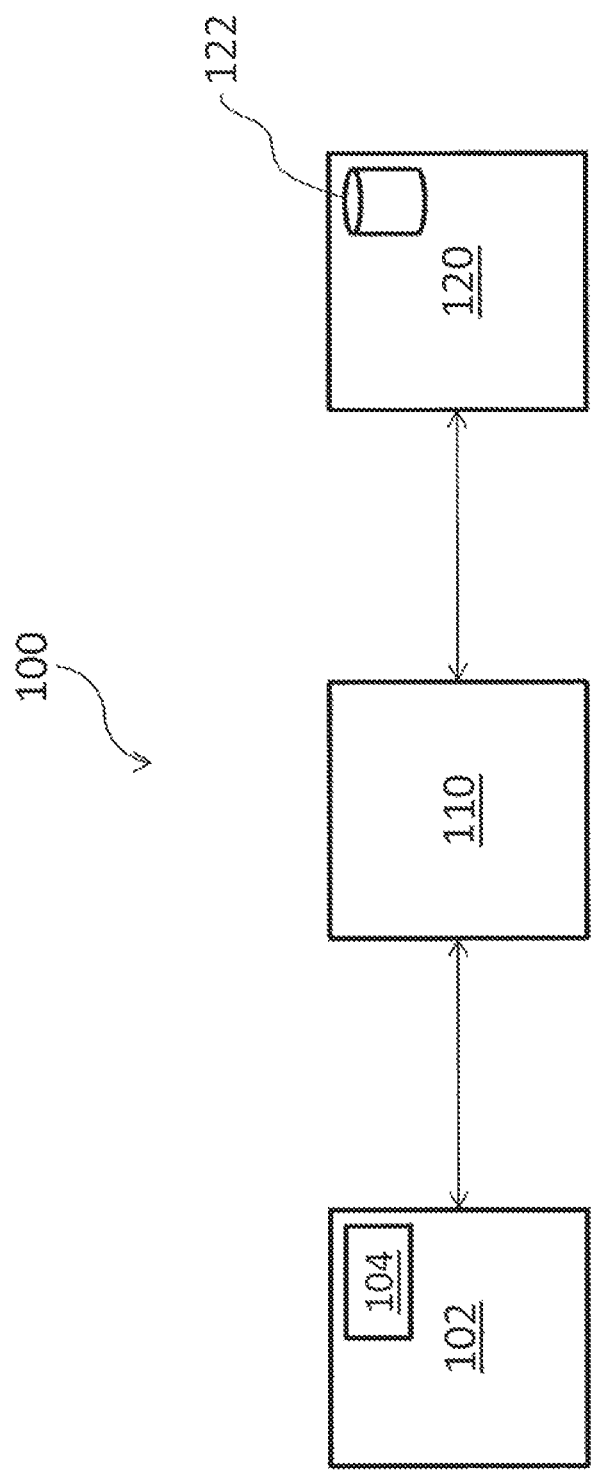
FIG. 1 is a block diagram of an access control system including a lock device and an access control management system.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 2:
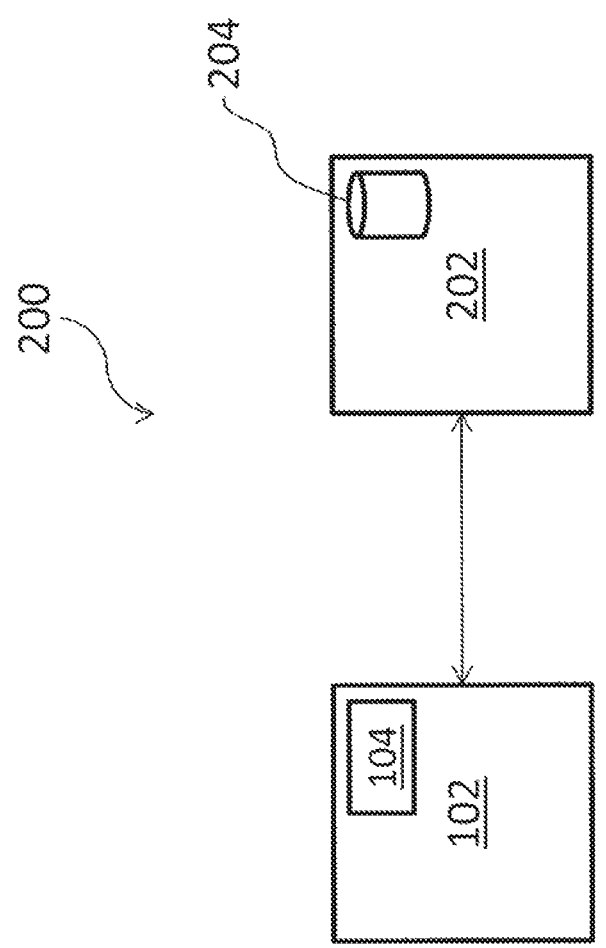
FIG. 2 is a block diagram of an access control system including a lock device.
Figure 3:
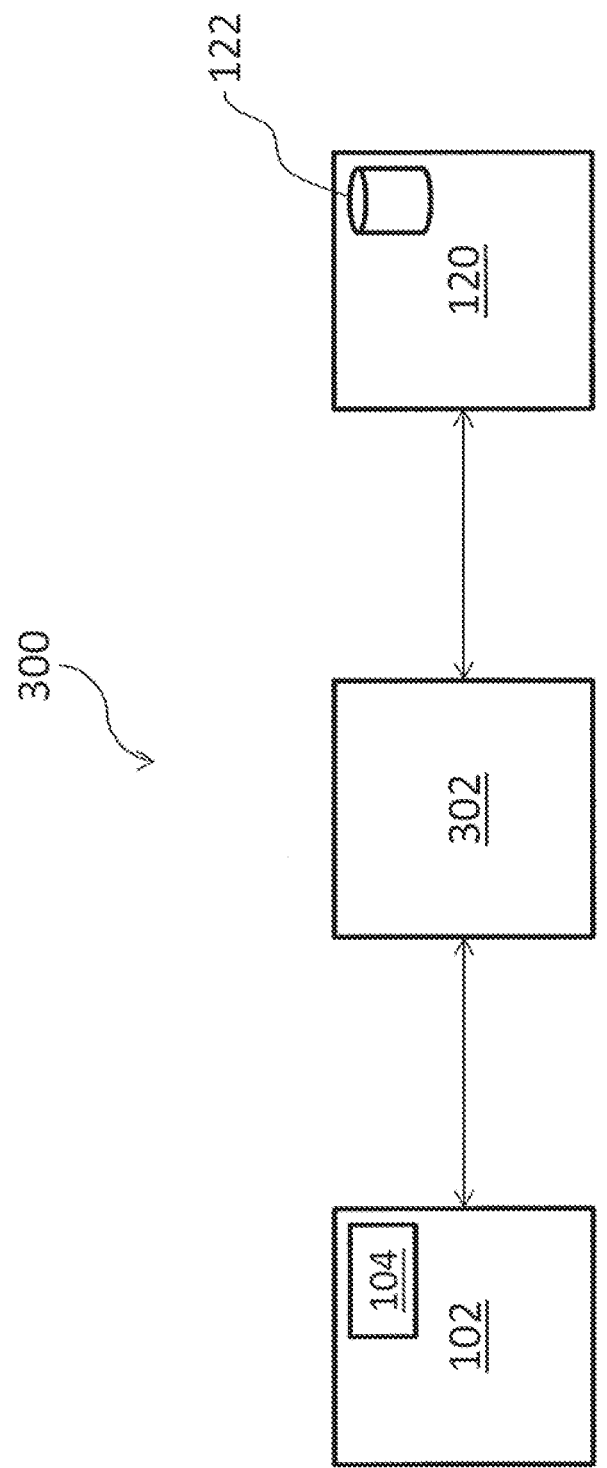
FIG. 3 is a block diagram of an access control system including a reader and an access control management system.

FIGS. 1-3 illustrate schematic block diagrams of non-limiting access control system component configurations. The illustrated access control system component configurations may be part of an access control system at a facility and/or a multi-family access control system at an apartment building, condominium building or hotel.

With reference to FIG. 1, a system 100 is illustrated including a credential 102, a lock 110, and an access control management system 120. It is contemplated that the system 100 may include more than one credential 102 and/or more than one lock 110. The credential 102 may include an access permission data structure stored in a memory 104 on the credential 102. The access permission data structure will be discussed in further detail below in association with FIG. 4. The memory 104 may be of one or more types such as, for example, a solid-state variety, electromagnetic variety, optical variety, or a combination of these forms. In certain embodiments, the credential may be in the form of a smart card, a key fob, a mobile phone (e.g., a smartphone), a tablet, a personal digital assistant, and/or any application capable of storing data and communicating with the lock 110. The credential 102 may communicate with the lock 110 by any communication method such as, for example, a wireless communication method including near field communication (NFC), Bluetooth, and/or Wi-Fi.

It is further contemplated that the system 100 may include more than one different type of lock 110. In certain embodiments, each different lock 100 type may only have permission to access a portion of the access permission data structure on an access request (i.e., when the credential is presented to the lock 110). In one such embodiment, a first different lock in the system 100 may access a first portion of the access permission data structure from the credential 102 to send to the access control management system 120, and a second different lock in the system 100 may access a second portion of the access permission data structure from the credential 102 to send to the access control management system 120.

The access control management system 120 may include a database 122 configured to store user lists, access logs, information related to each credential 102 (such as access permissions for each lock 110 corresponding to each user in the user lists), a location, status, and/or type identifiers for each lock 110, and/or any other information for the system 100. If the portion of the access permission data structure stored in memory 104 at the credential 102 is authenticated against the database 122 at the access control management system 120, a command may be sent from the access control management system 120 to unlock the lock 110. In certain embodiments, if the portion of the access permission data structure is not authenticated (i.e., is invalid), a command may be sent from the access control management system 120 to the lock 110 providing the user with feedback that the access request was invalid. In certain embodiments, the database 122 may be an access database.

The access control management system 120 may further include non-transitory computer executable instructions to perform various operations in the form of an application. The various operations may include, but are not limited to, functionality to manage the locks 110, verifying access permissions received from the credential 102 at each lock 110 and updating the database 122 user lists, access permissions, adding and/or removing locks 110 for the system 100.

The access control management system 120 and the lock 110 may communicate over any appropriate network such as, for example, a wide area network (WAN) (e.g., the Internet), a local area network (LAN), and/or any other communication network capable of sending and receiving signals between the access control management system 120 and the lock 110. It is contemplated that in certain embodiments the access control management system 120 may include a cloud-based or web portal application on a server remote to the system 100, a software application on a computing device local to the system 100, or a thick client or thin client application combining the local computing device and the remote server.

In certain embodiments, the access control management system 120 may be connected to the lock 110 via a physical connection such as, for example, USB, HDMI, FireWire, CAT 5, or any other type of wired data transfer connection method. In other embodiments, the access control management system 120 may be connected to the lock 110 via a wireless data transfer method such as, for example, Wi-Fi or Bluetooth.

With reference to FIG. 2, a system 200 is illustrated which includes the credential 102 and a lock 202. The lock 202 may include a local database 204 that may be configured to store an access log, location, type identifier, and/or any other information for the lock 202. The lock 202 may further include non-transitory computer executable instructions to perform various operations on the lock 202 and/or the local database 204. The various operations may include, but are not limited to, functionality to lock and unlock the lock 202, verify access permissions received from the credential 102 at the lock 202, update the local database 204 user list and/or access permissions.

System 200 may include more than one credential 102, and a single lock 202 or multiple locks 202. In certain embodiments, the plurality of locks may include two or more different lock types (e.g., a first lock including a keypad requiring a personal identification number (PIN) for access and a second lock that does not have a keypad, but may have a limited number of accesses per day threshold), with each lock type only having permission to access a portion of the access permission data structure. In one such embodiment, a first lock in the system 200 may require a first portion of the access permission data structure to authenticate the credential 102 against the database of the first lock, and a second lock in the system 200 may require a second portion of the access permission data structure to authenticate the credential 102 against the database of the second lock. In certain embodiments the local database of the first lock may be an access database, and the local database of the second lock may be a void database.

The credential 102 may communicate with the lock 202 by any communication method known in the art such as, for example, a wireless communication method including NFC, Bluetooth, or Wi-Fi.

With reference to FIG. 3, shown therein is a system 300 including the credential 102, a reader 302, and the access control management system 120. It is contemplated that the system 100 may include more than one credential 102 and/or more than one reader 302. It is further contemplated that the system 300 may include more than one different type of reader 302. In certain embodiments, each different reader 302 type may only have permission to access a portion of the access permission data structure.

In one such embodiment, a first different reader in the system 300 may access a first portion of the access permission data structure from the credential 102 to send to the access control management system 120, and a second different reader in the system 300 may access a second portion of the access permission data structure from the credential 102 to send to the access control management system 120. If the portion of the access permission data structure is authenticated against the database 122 at the access control management system 120, a command may be sent from the access control management system 120 to the unlock a lock associated with the reader 302. In certain embodiments, if the portion of the access permission data structure is not authenticated, a command may be sent from the access control management system 120 to the reader 302 to provide the user with feedback that the access attempt was unsuccessful.

The database 122 at the access control management system 120 may be configured to store user lists, access logs, information related to each credential 102, such as access permissions for each reader 302 corresponding to each user in the user lists, a location, status, and/or type identifiers for each reader 302, and/or any other information for the system 300. The access control management system 120 may further include non-transitory computer executable instructions to perform various operations including functionality to manage each reader 302, verify access permissions received from the credential 102 at each reader 302, update the database 122 user lists and/or access permissions, and/or adding and/or removing readers 302 for the system 100.

The access control management system 120 and the reader 302 may communicate over any appropriate network such as, for example, a wide area network (WAN) (e.g., the Internet), a local area network (LAN), and/or any other communication network capable of sending and receiving signals between the access control management system 120 and the reader 302. In certain embodiments, the access control management system 120 may be connected to the reader 302 via a physical connection such as, for example, USB, HDMI, FireWire, CAT 5, or any other type of wired data transfer connection method. In other embodiments, the access control management system 120 may be connected to the reader 302 via a wireless data transfer method such as, for example, Wi-Fi or Bluetooth.

In certain embodiments, the reader 302 may also include non-transitory computer executable instructions configured to perform an update to the credential 102. In certain embodiments, the access control management system 120 may push an update down to the reader 302 and/or the reader 302 may poll the access control management system 120 and pull the update down from the access control management system 120 if an update is available. During the next access request, the credential 102 may then be updated by the reader 302 with access data from the update. In other embodiments, presenting the credential 102 to a reader 302 (e.g., during an access request) may trigger the reader 302 to check for an update at the access control management system 120, and if the update is available, the reader 302 may download the available update and write the new access data to the credential 102.

It is contemplated that in certain embodiments, a combination of two or more of the systems illustrated in FIGS. 1-3 may be used in a single access control system.

Figure 4:
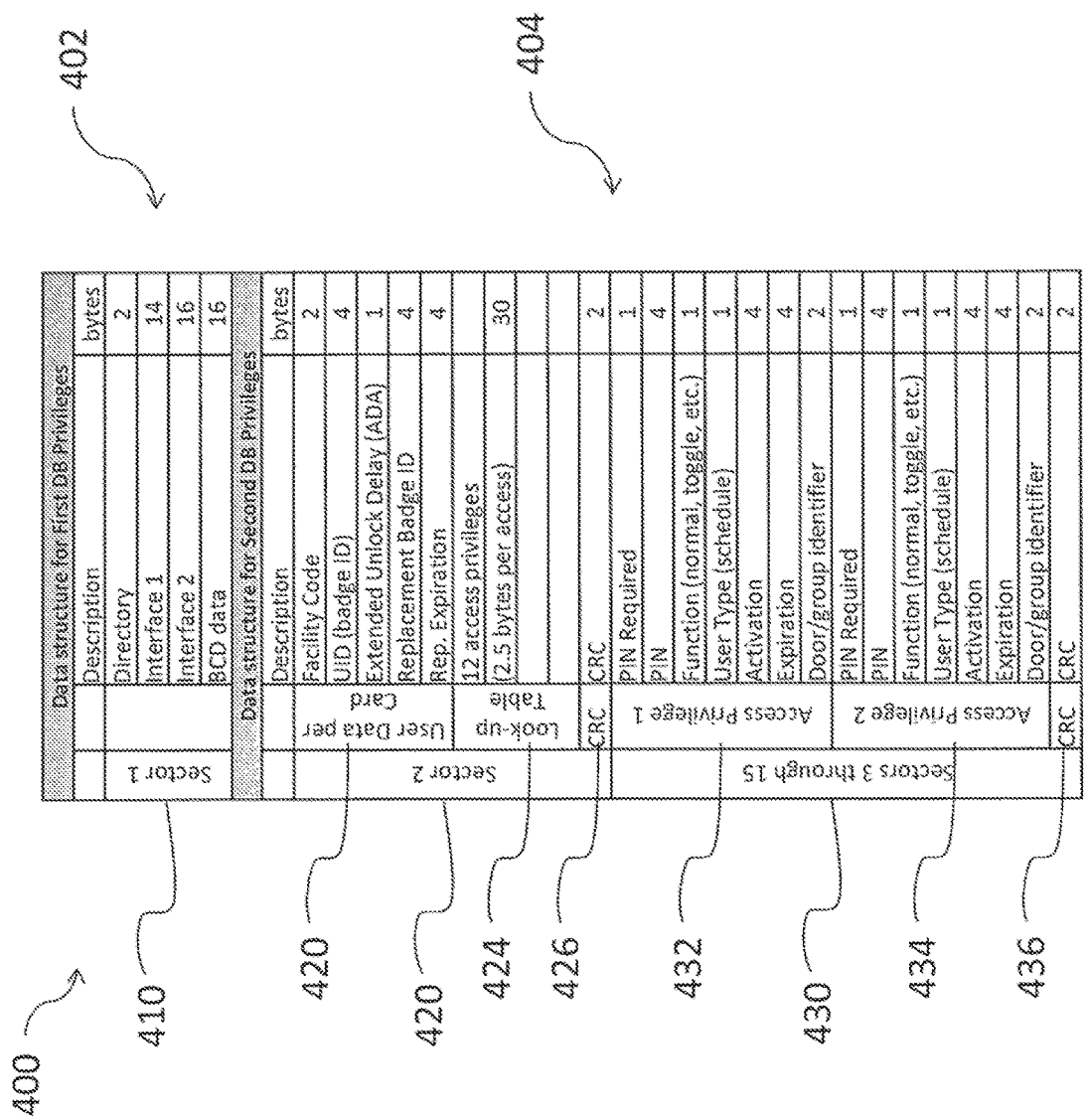
FIG. 4 is an illustration of an access permission data structure for a multi-access credential.

FIG. 4 illustrates an access permission data structure 400 for a multi-access credential such as, for example, the credential 102 set forth above. In the illustrated embodiment, the access permission data structure 400 includes a first data structure portion 402 including a first sector 410 for a first database type, and a second data structure portion 404 including a second sector 420 and remaining sectors 430 for a second database type. In certain embodiments, the first database type may be an access database and the second database type may be a void database.

The first sector 410 may include 16 sectors, where each sector can store 48 bytes of data, and may include two bytes of application type data, 30 bytes of interface data (e.g., Wiegand), and 16 bytes of binary-coded decimal (BCD) data. In certain embodiments the BCD data may include a site code and a badge identification.

The second sector 420 includes 15 bytes of user data 422, 31 bytes of look-up table data 424, and two bytes of cyclic redundancy check (CRC) 426. Each look-up table data 424 entry in the second sector 420 may include a group/door number and a sector number that may total 2.5 bytes, which would in turn allow for 12 access privileges in 31 the available bytes for the look-up table data 426. The user data 422 may include a facility code, a badge identifier, an extended unlock delay, a replacement badge identifier, and/or an expiration. The format of the second sector 420 may allow each lock to only look at the portion of the access permission data structure 400 for which it has permissions, and not all privileges (i.e., the entire access permission data structure 400) on the card.

The remaining sectors 430 (i.e., sectors three through fifteen) each include 17 bytes of a first set of access privilege data 432, 17 bytes of a second set of access privilege data 434, and 2 bytes of CRC 436. Each of the remaining sectors 430 including a first and second set of access privilege data 432, 434 would allow for up to 28 access privileges. Each set of access privilege data 432, 434 may include a PIN requirement (e.g., always, never, per a schedule), a PIN (e.g., an 8-digit PIN with BCD formatting), a credential function type (e.g., function the card performs with the lock/reader), a user type (e.g., schedule), an activation date, an expiration date, and/or a door/group identifier (e.g., access number identifying door/group).

In certain embodiments, the credential function type may include a programming credential, a normal use credential, a toggle credential, a freeze credential, and/or a pass-through credential. The programming credential may be configured to program the lock. In other words, the programming credential may not unlock the lock, but may instead just program the lock using information from the programming credential. The normal use credential may be configured to unlock the lock. The toggle credential may be configured to change the state of the lock from locked to unlocked, or vice versa. The freeze credential may freeze the lock in the current locked or unlocked state until the freeze credential is presented to the lock, or to reader. In certain embodiments, the toggle credential may be unable to change the state of the lock if a freeze credential has placed the lock into a frozen state. The pass-through credential may be configured to unlock a lock momentarily, regardless of the state. In certain embodiments, the pass-through credential may override a lock in the frozen state. The pass-through credential may be used, for example, by an access system administrator and/or an emergency personnel.

It is contemplated that in certain embodiments, any of the credential function types may include a PIN entry requirement. In such an embodiment, initiation of the access request may require presentment of the card to the lock or reader, and entry of a PIN at a keypad associated with the lock or reader.

In certain embodiments where the door number is a 12-bit door number, the access permission data structure 400 may allow 2,000 doors and 2,000 groups to be identified. In certain other embodiments where the door is a 16-bit door number, for example, the access permission data structure 400 may allow 32,000 doors and 32,000 groups to be identified. For the look-up table data 424 in sector two 420 with card data, the look-up table data may support 15 entries for 2,000 doors or 12 entries for 32,000 doors. For the look-up table data 424 in sector two 420 without card data, the look-up table data may support 24 entries for 2,000 door or 19 entries for 32,000 doors.

In one non-limiting embodiment, an access request between the multi-access credential and a lock or a reader may include only reading the portion of the access permission data structure 400 for which the lock or the reader has permission to access. In one such embodiment, the lock or the reader may only have access to read the first sector 410 of the access permission data structure 400 and either authenticate the data read from the first sector 410 locally, if the lock has a local database (e.g., the system 200 including the lock 202), or pass the data read from the first sector 410 of the access permission data structure 400 to the access control management system 120 for remote authentication (e.g., the system 100 including the lock 110 and/or system 300 including the reader 302).

In another such embodiment, the lock or the reader may only have access to read the second sector 420 of the access permission data structure 400. In one such embodiment, the lock or the reader may access and parse the look-up table data 424 to locate all applicable sectors for the applicable door and group numbers to determine access privileges. In an embodiment where the lock or reader only has access to the second sector 420 of the access permission data structure 400, the lock or reader may 1) read the second sector 420; 2) determine whether there is a valid replacement character, and if so, add the valid replacement character to the void list; 3) read the access look-up table data 424; 4) parse the access look-up table data 424; 5) grab the appropriate sector numbers for all applicable door numbers and group numbers; 6) open the appropriate sectors to grab the entire access privilege; and 7) make an access decision.

In certain embodiments, the access decision may be made based on the credential function type. In such embodiments, the credential function types may be assigned an order of precedence such that the lock access of one credential function type may supersede one or more of the other credential function types. In one example order of precedence, the pass-through credential may be given the highest priority, the freeze credential may be given the second highest priority, the toggle credential may be given the third highest priority, and the normal credential being given the lowest priority.

Figure 5:
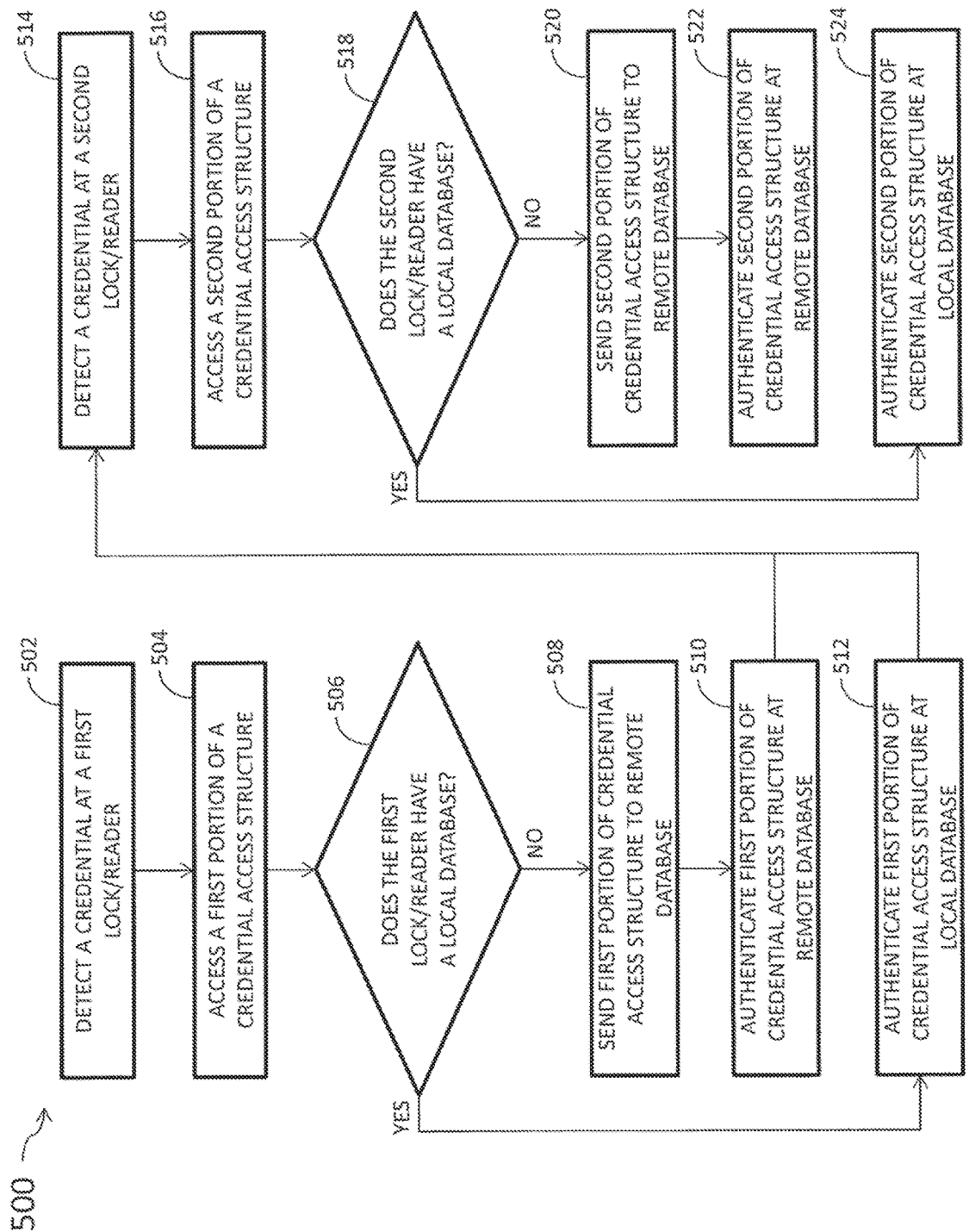
FIG. 5 is a schematic flow diagram of a procedure for an access control system for authenticating a credential including an access permission data structure that includes multiple access privileges.

FIG. 5 illustrates a schematic flow diagram of a procedure 500 for authenticating a credential, such as the credential 102, including an access permission data structure 400 in an access control system including more than one different type of lock and/or reader, where at least two of the different types of locks and/or readers include different database types. Operations illustrated for all of the processes in the present application are understood to be exemplary only, and operations may be combined or divided, and added or removed, as well as re-ordered in whole or in part.

Procedure 500 begins at operation 502 in which the credential 102 is detected at a first lock/reader including a first database type. From operation 502, procedure 500 continues to operation 504, where a first portion of the access permission data structure 400, such as the first data structure portion 402, for example, is accessed from the credential 102. Procedure 500 continues to conditional 506 to determine whether the first lock/reader includes a local database, such as the local database 204 of the lock 110 as illustrated in system 200.

If it is determined the first lock/reader does not include a local database, procedure 500 continues to operation 508, where the first portion of the access permission data structure 400 is sent to a remote database, such as the database 122 at the access credential management system 120 as illustrated in system 100 and system 300. From operation 508, procedure 500 continues to operation 510 to authenticate the first portion of the access permission data structure 400 against the remote database before proceeding to operation 514. If it is determined the first lock/reader does include a local database, procedure 500 continues to operation 510 to authenticate the first portion of the access permission data structure 400 against the local database before proceeding to operation 514.

At operation 514, the credential is detected at a second lock/reader including a second database type. From operation 514, procedure 500 continues to operation 516, where a second portion of the access permission data structure 400, such as the second data structure portion 404, for example, is accessed from the credential 102. Procedure 500 continues to conditional 518 to determine whether the second lock/reader includes a local database, such as the local database 204 of the lock 110 as illustrated in system 200.

If it is determined the second lock/reader does not include a local database, procedure 500 continues to operation 520, where the second portion of the access permission data structure 400 is sent to a remote database, such as the database 122 at the access credential management system 120 as illustrated in system 100 and system 300. From operation 520, procedure 500 continues to operation 522 to authenticate the second portion of the access permission data structure 400 against the remote database. If it is determined the second lock/reader does include a local database, procedure 500 continues to operation 524 to authenticate the second portion of the access permission data structure 400 against the local database.

The various aspects of the procedure 500 in the present application may be implemented in operating logic as operations by software, hardware, artificial intelligence, fuzzy logic, or any combination thereof, or at least partially performed by a user or operator. In certain embodiments, operations represent software elements as a computer program encoded on a computer readable medium, wherein a processor of the credential 102, the lock 110, the lock 202, the reader 302, and/or the access control management system 120 performs the described operations when executing the computer program.

The circuitry of the credential 102, the lock 110, the lock 202, the reader 302, and/or the access control management system 120 may be configured to provide appropriate signal conditioning to transmit and receive desired information (data), and correspondingly may include filters, amplifiers, limiters, modulators, demodulators, CODECs, digital signal processing, and/or different circuitry or functional components as would occur to those skilled in the art to perform the desired communications.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Further, when the language "at least a portion" and/or "a portion" is used the item may include a portion and/or the entire item unless specifically stated to the contrary.

The invention claimed is:

1. A credential for use in an access control system, comprising:
   a first sector including first data of a first database type;
   a second sector including second data of a second database type that is different from the first database type; and
   a third sector including third data.

2. The credential of claim 1, wherein the second data further includes a look-up table for the third data stored in the third sector.

3. The credential of claim 2, wherein the third data includes access privileges for a user.

4. The credential of claim 3, wherein the access privileges include the fields of a personal identification number (PIN), function, user type, activation, deactivation and door/group identifier.

5. The credential of claim 1, wherein the second data includes a facility code and a unique identifier (UID) for a user.

6. The credential of claim 5, wherein the second data further includes a replacement UID.

7. The credential of claim 1, wherein the first data includes access privileges for a user.

8. The credential of claim 1, wherein a first lock is configured to read the first data of the first database type, wherein a second lock is configured to read the second data of the second database type, wherein the first lock is not configured to read the second data of the second database type, and wherein the second lock is not configured to read the first data of the first database type.

9. The credential of claim 1, wherein the third sector includes a plurality of sub sectors; and
   wherein each subsector of the plurality of subsectors includes a first set of access privilege data and a second set of access privilege data; and
   wherein each of the first set of access privilege data and the second set of access privilege data is arranged by fields associated with an indication of whether a personal identification number is required.

10. The credential of claim 1, wherein the first sector includes fields associated with an application type, interface data, and binary-coded decimal data.

11. The credential of claim 10, wherein the binary-coded decimal data comprises a site code and a badge identification.

12. The credential of claim 10, wherein the interface data includes Wiegand interface data.

13. The credential of claim 1, wherein the second data includes user data that is arranged by fields associated with a facility code, a badge identifier, an extended unlock delay, a replacement badge identifier, and an expiration date of the replacement badge identifier.

14. A method, comprising:
   reading, with a first lock, first data of a first database type from a first sector of a credential; and
   reading, with a second lock, second data of a second database type from a second sector of the credential, the second database type being different from the first database type, and the second data including a look-up table for third data stored in a third sector of the credential.

15. The method of claim 14, wherein the first lock cannot read data from the second sector, and wherein the second lock cannot read data from the first sector.

16. The method of claim 14, further comprising authenticating the credential based on the first data of the first database type; and
   authenticating the credential based on the second data of the second database type.

17. The method of claim 14, wherein the first database type is an access database and the second database type is a void database.

18. A credential card for use in an access control system, the credential card comprising:
   a memory having stored thereon an access permission data structure that includes:
      a first sector including first data of a first database type accessible by a first reader device to authenticate the credential card; and
      a second sector including second data of a second database type that is different from the first database type and accessible by a second reader device to authenticate the credential card but inaccessible to the first reader device.

19. The credential card of claim 18, wherein the first database type is an access database and the second database type is a void database.

20. The credential card of claim 18, wherein a first lock is configured to read the first data of the first database type and not configured to read the second data of the second database type; and
   wherein a second lock is configured to read the second data of the second database type and not configured to read the first data of the first database type.

* * * * *